(12) United States Patent
Paparatto et al.

(10) Patent No.: US 6,284,213 B1
(45) Date of Patent: Sep. 4, 2001

(54) CATALYST, PROCESS FOR THE PRODUCTION OF HYDROGEN PEROXIDE AND ITS USE IN OXIDATION PROCESSES

(75) Inventors: Giuseppe Paparatto, Cinisello Balsamo; Rino D'Aloisio, Novara; Giordano De Alberti, Besnate; Piero Furlan, Treviso; Vittorio Arca, Chioggia; Roberto Buzzoni, San Mauro Torinese; Laura Meda, Galliate, all of (IT)

(73) Assignee: Enichem S.p.A., Milan (IT)

( * ) Notice: Subject to any disclaimer, the term of this patent is extended or adjusted under 35 U.S.C. 154(b) by 0 days.

(21) Appl. No.: 09/365,864

(22) Filed: Aug. 3, 1999

(30) Foreign Application Priority Data

Aug. 5, 1998 (IT) .............................. MI98A1843

(51) Int. Cl.$^7$ .................... B01J 21/18; C01B 15/01
(52) U.S. Cl. ............... 423/403; 423/415.1; 423/584; 502/180; 502/185; 549/531; 564/259; 568/803
(58) Field of Search ............................. 502/180, 185; 423/584, 403, 415.1; 549/531; 564/259; 568/803

(56) References Cited

U.S. PATENT DOCUMENTS

| | | | |
|---|---|---|---|
| 3,584,061 | * 6/1971 | Olstowski et al. | 502/180 |
| 3,850,843 | * 11/1974 | Kunugl et al. | 502/180 |
| 4,007,256 | * 2/1977 | Kim et al. | 423/584 |
| 4,279,883 | * 7/1981 | Izumi et al. | 423/584 |
| 4,532,227 | * 7/1985 | Suggitt | 502/180 |
| 4,661,337 | 4/1987 | Brill . | |
| 4,681,751 | * 7/1987 | Gosser | 423/584 |
| 4,921,826 | * 5/1990 | Jüntgen et al. | 502/180 |
| 5,449,655 | * 9/1995 | Albers et al. | 502/185 |
| 5,489,564 | 2/1996 | Wu . | |

FOREIGN PATENT DOCUMENTS

| | | | |
|---|---|---|---|
| 237063 | * 7/1986 | (DE) | 502/180 |
| 0 542 620 A1 | 5/1993 | (EP) . | |
| 17634 | * 2/1981 | (JP) | 502/180 |
| 84309 | * 7/1981 | (JP) | 502/180 |
| 8006453 | * 6/1982 | (NL) | 502/180 |

OTHER PUBLICATIONS

Chemical Abstracts 113:194854 (No Date).*
Chemical Abstracts 90:170820 (No Date).*

* cited by examiner

*Primary Examiner*—Wayne Langel
(74) *Attorney, Agent, or Firm*—Oblon, Spivak, McClelland, Maier & Neustadt, P.C.

(57) ABSTRACT

The present invention relates to a catalyst consisting of a metal of the VIII group supported on acid activated carbon functionalized with sulfonic groups, a process for the synthesis of hydrogen peroxide from hydrogen and oxygen which uses said catalyst and the use of the hydrogen peroxide solution in oxidation processes catalyzed by titanium-silicalite.

38 Claims, 1 Drawing Sheet

CATALYST, PROCESS FOR THE PRODUCTION OF HYDROGEN PEROXIDE AND ITS USE IN OXIDATION PROCESSES

BACKGROUND OF THE INVENTION

1. Field of the Invention

The present invention relates to a catalyst consisting of a metal of the VIII group supported on acid activated carbon functionalized with sulfonic groups, a process for the direct synthesis of hydrogen peroxide from hydrogen and oxygen which uses said catalyst and the use of the hydrogen peroxide solution in oxidation processes catalyzed by titanium-silicalite.

2. Description of the Background

Hydrogen peroxide is a commercially important product which is widely used as bleaching agent in the textile and paper industries, in the environmental field as a biocide and in the chemical industry.

In particular the use of hydrogen peroxide is known in the art in a series of oxidation reactions catalyzed by titanium silicalite, such as for example the epoxidation of olefins (EP-100,119, the ammoxymation of carbonyl compounds (U.S. Pat. No. 4,794,198), the oxidation of ammonia to hydroxylamine (U.S. Pat. No. 5,320,819) and the hydroxylation of aromatic hydrocarbons (U.S. Pat. No. 4,369,783)

Generally solutions of hydrogen peroxide are used, obtained by synthesis processes which are based on the alternating oxidation and reduction of alkylanthraquinones.

These processes however, have substantial disadvantages deriving from the necessity of operating with large volumes of reagents, the numerous steps required, the relatively high cost of the intermediates and the production of inactive by-products.

As a result, other processes for the synthesis of hydrogen peroxide have been proposed in the art, among which those using a catalytic system consisting of a noble metal, preferably palladium, supported on a carrier, for the direct synthesis of hydrogen peroxide from hydrogen and oxygen.

For example, U.S. Pat. No. 4,772,458 describes a process for the synthesis of hydrogen peroxide which uses a catalyst based on palladium supported on coal, in which the reaction is carried out in water in the presence of hydrogen ions and bromide ions in a molar ratio of at least 2:1.

The $H^+$ and $Br^-$ ions are supplied as a combination of a strong acid such as sulfuric, phosphoric, hydrochloric or nitric acid, and a bromine salt.

Quantities of acid ranging from 2.5 to 10 g/litre are generally required to obtain high concentrations of $H_2O_2$.

The use of high quantities of acid, in addition to creating problems of a technological nature, for example corrosion of the autoclaves, also causes serious problems relating to the dissolution of the active phase (metal) of the catalyst in the reaction medium, with a consequent reduction in the activity and life of the catalyst itself.

The metal dissolved in the reaction medium, moreover, is difficult to recover with the recycling methods at present available.

In addition, the process operates under critical conditions as concentrations of $H_2 > 5\%$ (generally 18%) with respect to the reaction mixture, are used, which is therefore within the explosivity limits of $H_2/O_2$ mixtures.

U.S. Pat. No. 4,889,705 relates to an improved process for the synthesis of hydrogen peroxide in which the $H^+$ and $Br^-$ ions are supplied directly as HBr. Operating according to this process Quantities of $Br^-$ ions of more than $10^{-4}$ moles/litre are required to obtain hydrogen peroxide. The use of high quantities of halides creates problems of instability of both the catalyst metal and the hydrogen peroxide solution produced.

To overcome these drawbacks alternative processes have been proposed which can be carried out without acids and/or bromine ions in the reaction medium.

For example, patent application EP-492,064 describes a process for the synthesis of hydrogen peroxide from hydrogen and oxygen, which uses a catalyst based on palladium supported on a halogenated resin, in particular a brominated styrene/divinylbenzene resin.

The reaction is carried out in water, in the presence of an acid selected from sulfuric, phosphoric or nitric acid. Operating with this process however, concentrations of $H_2O_2$ of about 0.58% are obtained.

EP-504741 describes a process for the synthesis of $H_2O_2$ front hydrogen and oxygen which uses a catalyst based on palladium or platinum supported on an acid or superacid carrier selected from molibden, zirconium or tungsten oxides.

The reaction is carried out in water, in the presence of a promoter selected from bromine salts in quantities of more than 0.1 mmoles/l of reaction mixture. Operating according to this process hydrogen peroxide is obtained in concentrations not higher than 1%.

U.S. Pat. No. 5,320,921 describes a process for the synthesis of $H_2O_2$ from hydrogen and oxygen which uses a catalyst based on palladium or platinum supported on a heteropolyacid made insoluble in water. The reaction is carried out in water in the presence of bromine ions (0.5 mmoles/litre of sodium bromide). Quantities of $H_2O_2$ equal to about 1.1% are obtained.

These processes of the known art, therefore, do not have a productivity, referring to the quantity of hydrogen peroxide produced, which is sufficiently high for their application on an industrial scale to be of interest.

SUMMARY OF THE INVENTION

There is consequently an evident necessity for further improvements in the field of the production of hydrogen peroxide.

It has now been found that it is possible to satisfy these demands of the known art by means of a simple and convenient process which is based on the use of a catalyst consisting of a metal of group VIII supported on acid activated carbon functionalized with sulfonic groups.

DETAILED DESCRIPTION OF THE PREFERRED EMBODIMENTS

Figure 1:
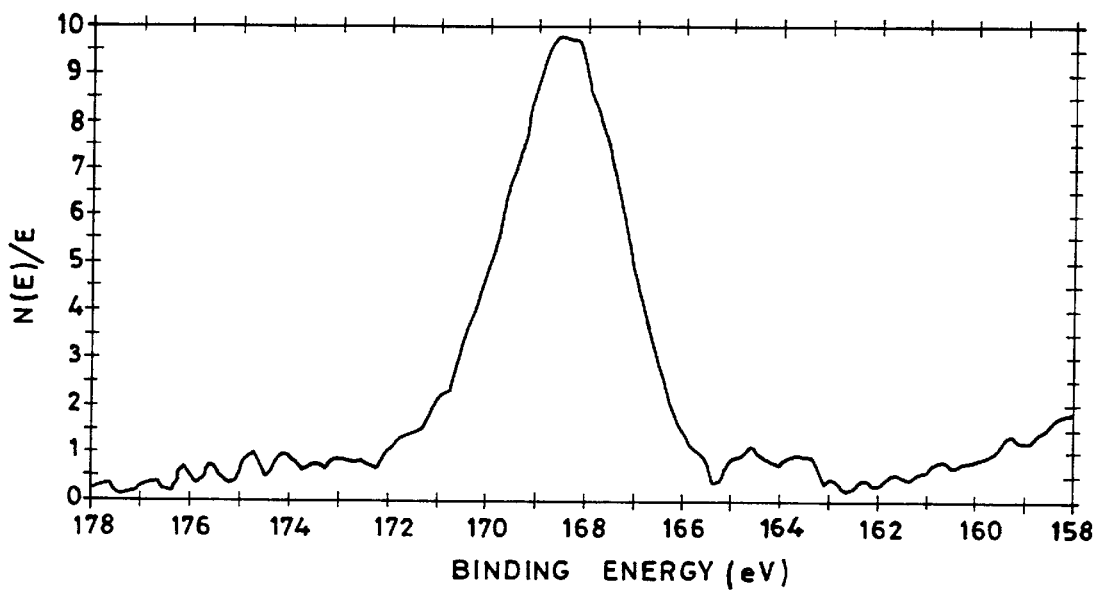
FIGS. 1 and 2 show the enlarged peak of sulfur alone for samples of sulfonated activated carbon.

The use of functionalized activated carbon containing the acid function directly bound to the surface and not released in the reaction medium has significant advantages, in particular:
(i) the possibility of using extremely low quantities of halides ($<10^{-4}$ moles/litre);
(ii) the( possibility of operating without free acids or in the presence of traces of free acids ($H^+ < 10^{-4}$ moles/l);
(iii) the production of a stable catalyst; the quantity of noble metal in solution is less than 3 parts per billion (ppb);

(iv) the production of stable solutions of hydrogen peroxide;
(v) the production of solutions of hydrogen peroxide in high concentrations.

This is an advantage for subsequent uses of $H_2O_2$ in oxidation processes, as intermediate processing operations such as, for example, the removal of solvents, are not required. In particular, the concentration of hydrogen peroxide which can be obtained with the process of the present invention is highly compatible with a direct use in oxidation reactions catalyzed by titanium-silicalite, without requiring concentration steps.

The presence of only traces of halides and acidity is not a disadvantage for direct use in the above reactions, as the possible introduction of salts or acidity, in downstream processes is minimized.

In accordance with this, a first aspect of the present invention relates to a catalyst consisting of a metal of group VIII supported on an acid activated carbon functionalized with sulfonic groups.

A further object of the present invention relates to a method for the preparation of an activated carbon functionalized with sulfonic groups.

The present invention also relates to an activated carbon functionalized with sulfonic groups and its use as a carrier for catalysts based on metals.

Yet another object of the present invention relates to a process for the production of hydrogen peroxide( starting from hydrogen and oxygen, in a solvent, in the presence of a promoter and a catalytic system consisting of a metal of group VIII supported on a carrier, characterized in that said carrier is an activated carbon functionalized with sulfonic groups.

The present invention additionally relates to the use of solutions of hydrogen peroxide obtained as described above in an oxidation process catalyzed by titanium-silicalite.

Further objects of the present invention are evident in the following description and claims.

Examples of activated carbon which can be used for the purposes of the present invention can be selected from activated carbon available on the market with a surface area of at least 100 $m^2/g$.

Activated carbon with a surface area higher than 300 $m^2/g$ is preferably used.

The activated carbon used can be in the form of powder, granes, pellets, etc.

The activated carbon can be used as such or it is pretreated by washing with a diluted solution, generally between 1 and 10% by weight, of aqueous hydrochloric acid, a 50–800° C.

The functionalization is carried out with a sulfonating agent preferably selected from sulfuric acid, $SO_3$ or oleum.

The functionalization of activated carbon is generally carried out using a weight ratio sulfonating agent:activated carbon ranging from 1:20 to 20:1, preferably between 1:5 and 5:1.

The functionalization reaction is carried out at a temperature ranging from 50° C. to 350° C., preferably from 70° C. to 200° C., for a period of time selected in relation to the temperature and sulfonating agent.

The activated carbon thus treated is then washed with water until neutrality of the washing water. The functionalized activated carbon is subsequently treated with an oxidating agent. A diluted aqueous solution of $H_2O_2$ (1–4% by weight) is preferably used, with a weight ratio sulfonated carbon:$H_2O_2$ solution ranging from 1:10 to 1:100, preferably between 1:20 and 1:50.

The resulting suspension is maintained, under stirring, at a temperature ranging from 30 to 100° C., preferably from 50 to 70° C., for a period of time ranging from 1 to 4 hours. It is then filtered, washed until the disappearance of the oxidating agent in the washing water and is then dried at a temperature ranging from 100° C. to 120° C.

The characterization of the functionalized activated carbon by means of photoelectron spectroscopy (XPS) reveals the presence of a peak characteristic of C—$SO_3H$ groups.

This method is capable of providing information on the chemical species present on the surface of a solid sample within 5 nm approx.), on the oxidation states of a certain element, and also on the ligands of a particular atom, in fact the position of the signal is determined by the electronic exchange with the environment.

The sensitivity limit for sulfur can be estimated at about 50 ppm in the volume analyzed (1257 microns$^2$×5 nm). The analysis is carried out in ultra high vacuum (UHV) ($10^{-10}$ Torr) and consequently the species physi-absorbed on the surface are eliminated and the essentially chemically bound species are analyzed.

As the samples are good electric conductors, the analysis is not affected by problems of surface electrostatic charge. The peak positions recorded on the axis of the "Binding Energies" are therefore not influenced by error, as they have been calibrated with an appropriate internal standard.

Semi-quantitative analysis (atomic %) provides the atomic concentrations of all the elements present above the sensitivity limit except for hydrogen which cannot be determined.

High resolution analysis of the sulfur signal (S) gives indications on the relative chemical environment.

Figure 2:
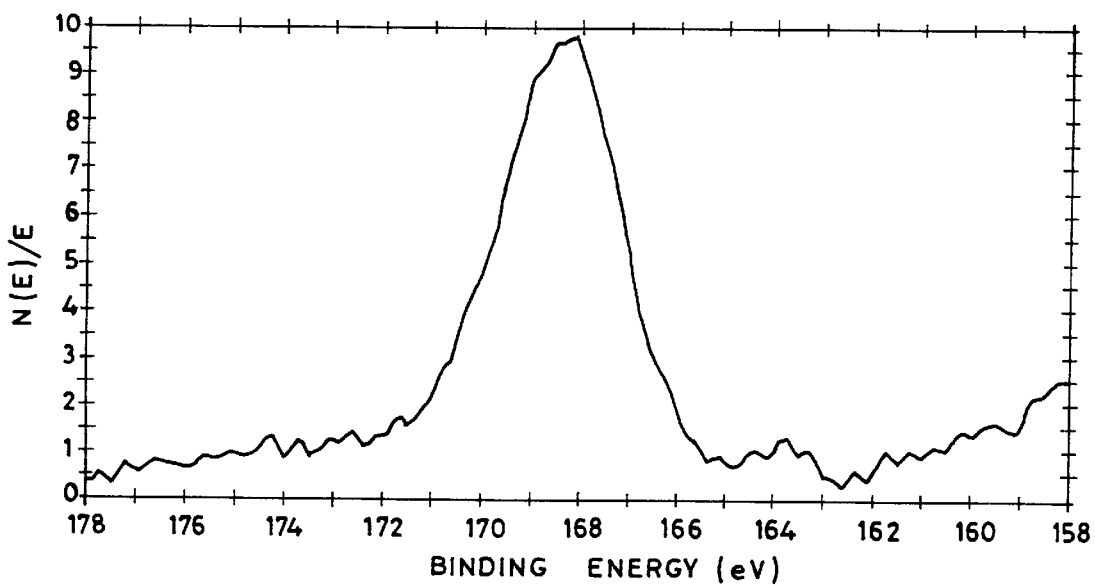

FIGS. 1 and 2 show the enlarged peak of sulfur alone. It can be observed that the sulfur of the sample of sulfonated activated carbon is symmetrical with an enlargement of about 3 eV (Binding energy); this indicates the presence of a univocal but energetically heterogeneous species on the surface. The position in energy of the peak maximum (168.4±0.2 eV), compared with the data supplied by the reference handbook (Handbook of XPS, ed J. Chastain, PE Corporation, Mo. USA, 1992, pages 60–61) inequivocably indicates the presence of a sulfur species of the sulfonic type (—$SO_2OH$) which is expected between 167–169 eV. This species: cannot be confused with sulfur of the sulfide type (161–163 eV), or with sulfur of the sulfate type (169–171 eV).

Operating as described in the experimental examples below, functionalized activated carbon is obtained with a sulfur content of 0.3 to 0.5% by weight with respect to the carrier.

However, lower or higher quantities than these values can be introduced depending on the starting carrier and operating conditions.

Quantities of sulfur ranging from 0.1 to 1.0% by weight are sufficient for the purposes of the present invention.

The catalyst of the present invention is prepared by supporting a metal of group VIII on activated carbon functionalized as described above.

Non-limiting examples of metals of group VIII are selected from palladium, platinum, ruthenium, iridium, rhodium or combinations of these. Palladium or platinum are preferably used. Palladium is particularly preferred.

The quantity of metal supported on functionalized activated carbon is between 0.05 and 5% by weight, preferably between 0.1 and 1% by weight.

The preparation of the catalyst of the present invention can be carried out by means of impregnation or adsorption of a soluble salt of the metal, optionally followed by a reduction phase of the metal with hydrogen or chemical reducing agents, according to the conventional techniques.

Metal salts selected from acetates, halides and oxalates are preferably used.

The catalyst of the present invention is particularly advantageous in a process for the direct preparation of hydrogen peroxide from hydrogen and oxygen in a solvent in the presence of a promoter selected from halogenated compounds.

The catalyst is used in catalytic quantities generally ranging from $10^{-6}$ to $10^{-2}$ moles of metal contained in the catalyst per litre of reaction medium.

Advantageous results are obtained using quantities of catalyst ranging from $10^{-4}$ to $10^{-3}$ moles of metal contained in the catalyst per litre of reaction medium.

The reaction solvent is selected from water, alcohols, or mixtures of these.

Examples of alcohols are methyl, ethyl, isopropyl alcohol. Methyl alcohol is preferred.

A mixture of water:alcohol with a weight ratio ranging from 99/1 to 1/99, preferably between 90/10 and 5/95 is preferably used.

Examples of promoters are selected from compounds of bromine such as hydrobromic acid, sodium bromide, potassium bromide, sodium bromate or ammonium bromide or compounds of chlorine such as sodium chloride, potassium chloride, ammonium chloride.

Compounds of bromine are preferred for the purposes of the present invention. Particularly preferred are hydrobromic acid, sodium bromide and potassium bromide.

A quantity of promoter is normally used which is such as to give a concentration of halide ion of more than $10^{-7}$ moles per litre of reaction medium, preferably a concentration ranging from $10^{-6}$ to $10^{-4}$ moles per litre of reaction medium.

The production of hydrogen peroxide is effected by reacting oxygen and hydrogen in the reaction medium in the presence of the catalyst and promoter and with or without an inert gas (for example nitrogen), generally at a total pressure higher than atmospheric pressure and preferably between 50 and 300 atmospheres.

The molar ratio $H_2/O_2$ is between 1/1 and 1/100, preferably between 1/5 and 1/50 and the concentration of hydrogen in the gaseous phase in contact with the liquid reaction medium is conveniently maintained at a value of less than 4.5% molar with respect to the reaction mixture, outside the explosivity limits of the $H_2/O_2$ mixture.

According to an embodiment of the present invention, the reaction can be carried out using air instead of pure oxygen.

This reaction is typically carried out at temperatures ranging from 0° to 90° C., preferably between 15 and 50° C.

At the end of the reaction, the solution containing hydrogen peroxide is recovered and the catalyst is separated and recovered by filtration and recycled to the subsequent reaction.

The process of the present invention can be carried out in batch or in continuous according to the conventional techniques.

The resulting solution of hydrogen peroxide can be used as such. However, if necessary it can be subjected to concentration operations to remove the solvent by distillation.

The process of the present invention enables the reagents to be transformed into $H_2O_2$ with high conversions and selectivities, obtaining solution of $H_2O_2$ without acidity or containing only traces of acidity and salts.

The solutions of hydrogen peroxide thus obtained can be used directly in oxidation processes which involve the use of $H_2O_2$ without complex intermediate processing operations such as the removal of acids and solvents.

In particular, the hydrogen peroxide solutions obtained with the process of the present invention can be used directly in oxidation processes catalyzed by titanium silicalite as described in the patents cited above, as they are highly compatible with the optimum reaction conditions in which these processes are carried out with respect to:

the concentration of $H_2O_2$ in the solution;

the absence of acidity or the presence of only traces of acidity or salts;

the composition of the solvent medium consisting of water, alcohols or their mixtures in a wide range of ratios.

The use of hydrogen peroxide solutions in oxidation processes comprises the following steps:

(a) preparing hydrogen peroxide by the reaction of hydrogen and oxygen in a solvent containing a promoter, in the presence of a catalyst consisting of a metal of group VIII supported on acid activated carbon functionalized with sulfonic groups;

(b) recovering the reaction mixture containing hydrogen peroxide;

(c) putting the reaction mixture containing $H_2O_2$ in contact with a substrate selected from olefins, aromatic hydrocarbons, ammonia and carbonyl compounds, in the presence of a catalyst based on titanium-silicalite to obtain the desired oxidated product;

(d) recovering the oxidated product from the reaction mixture of step c); and (e) recycling the possible non-reacted substrate in step c) and the reaction solvent in steps a) and c).

Examples of titanium-silicalites which can be used for the purposes of the present invention can be selected from titanium-silicalites with an MFI structure described in the U.S. Pat. No. 4,410,501, or the same titanium-silicalites modified with trivalent metals such as, for example, aluminum, iron, boron or gallium The latter are described in European patents 226,257, 226,258 and 266,825.

Titanium-silicalites with an MEL or intermediate MFI/MEL structure described in Belgian patent 1,001,038, can also be used.

The preferred catalyst according to the present invention is titanium-silicalite having the formula:

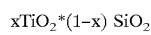

$$xTiO_2 * (1-x) SiO_2$$

wherein x represents a number between 0.0001 and 0.04.

The above titanium silicalites can be prepared according to the method described in the U.S. Pat. No. 4,410,501 in which their structural characteristics are also specified.

The quantity of catalyst used as well as the reaction conditions are selected in relation to the substrate to be oxidated.

In particular, the epoxidation of olefins can be carried out as described in the patent EP-100,119. The use of a hydroalcoholic solution of hydrogen peroxide obtained with the process of the present invention advantageously allows in the epoxidation of olefins an improvement in the selectivity, at the same time simplifying the process operations owing to the substantial absence of acidity and/or salts which, in high concentrations, interfere with epoxidation reactions. In fact, a solution of hydrogen peroxide is obtained with only traces of acidity (pH about 4–6, higher than that of commercial hydrogen peroxide) and without stabilizers.

In the case of an ammoxymation process, (cyclohexanoneoxime from cyclohexanone, $H_2O_2$, ammonia), the use of a methanol solution of hydrogen peroxide, instead of terbutanol (TBA), allows a simplification in the separation section of cyclohexanoneoxime and recycling of the solvent (methanol) as, unlike TBA, it does not form an azeotropic mixture with water.

The following examples, whose purpose is to describe the present invention in better detail, should in no way be interpreted as limiting the scope of the invention itself.

EXAMPLE 1

Functionalization of Carbon 20 g of activated maritime pinewood carbon in powder form (CECA) are charged into a 1 litre glass flask containing 600 ml of an aqueous solution of HCl at 5% by weight. The stirred suspension is brought to 80° C. and maintained at this temperature for 2.5 hours. After cooling to room temperature (20–25° C.), the suspension is filtered and the carbon recovered is washed with distilled water until elimination of the chlorides and dried in an oven at 120° C. for 2 hours.

The activated carbon is charged into a 250 ml glass flask and 40 ml of $H_2SO_4$ at 96% are slowly added (in about 2–3 minutes). The carbon-acid mixture is homogenized and then heated in an oil bath to 120° C. for 8 hours. At the end of the reaction, it is cooled to room temperature and the activated carbon thus treated is slowly poured into a 1 litre glass containing 500 ml of distilled water. The carbon is then recovered by filtration and washed with distilled water until neutrality of the washing water.

The activated carbon thus treated is suspended in 150 ml of an aqueous solution of $H_2O_2$ (3.5% by weight) and the resulting suspension is maintained, under stirring, at 70° C. for 2 hours. It is then filtered and washed until the disappearance of $H_2O_2$ in the washing water. The sulfonated activated carbon is recovered and dried in an oven at 120° C. for 2 hours.

Characterization by means of X-ray induced photoelectron spectroscopy (XPS) shows the presence of a peak relating to the signal C—$SO_3H$ (FIG. 1)

The results expressed in atomic % from XPS analysis are indicated in table 1.

TABLE 1

| Sample | C | O | S | Cl | Si | Na |
|---|---|---|---|---|---|---|
| 1 | 88.7% | 10.7% | 0.12% | 0.3% | 0.1% | 0.06% |

Elemental characterization was carried out on the sample of sulfonated carbon (Nr. 1). The results, expressed in mg/kg, are indicated in table 3 and show a sulfur content of 0.39% by weight.

EXAMPLE 2

Functionalization of Carbon

The same procedure is adopted as in example 1, but carrying out the sulfonation reaction at a temperature of 140° c. for 4 hours.

Characterization by means of X-ray induced photoelectron, spectroscopy (XPS) shows the presence of a peak relating to the signal C—$SO_3H$ (FIG. 2)

The results expressed in atomic % from XPS analysis are indicated in table 2.

TABLE 2

| Sample | C | O | S | Cl | Si | Na |
|---|---|---|---|---|---|---|
| 2 | 90.3% | 9.1% | 0.14% | 0.3% | 0.1% | 0.08% |

Elemental characterization was carried out on the sample of sulfonated carbon (Nr. 2). The results, expressed in mg/kg, are indicated in table 3 and show a sulfur content of 0.48% by weight.

EXAMPLE 3

Preparation of the Catalyst 50 ml of methanol and 4 g of activated carbon prepared as described in example 1 are charged into a 250 ml glass flask.

A solution of palladium acetate in acetone (86 mg palladium acetate 98% Aldrich, in 20 ml of acetone) are added dropwise in 2–3 minutes to the stirred suspension. The solution is concentrated with a rotovapor on a bath, at 40–50° C., for 10–20 minutes to remove about 30–50% of the solvent. It is filtered with a pump, washed with water, dried in air and then dried in an oven at 110° C. for 2 hours. A catalyst is obtained containing 1% of palladium on functionalized activated carbon.

EXAMPLE 4

Preparation of the Catalyst

The same procedure is adopted as in example 3, but using 4 g of activated carbon prepared as described in example 2. A catalyst is obtained containing 1% of Palladium on functionalized activated carbon.

EXAMPLE 5 (comparative)

A catalyst is prepared as described in example 3, but using a non-sulfonated activated maritime pinewood carbon in powder form (CECA).

EXAMPLE 6

Preparation of Hydrogen Peroxide 23 mg of catalyst prepared as described in example 4 ($2.10^{-6}$ moles of Pd) and 9 g of a solution of water: ethanol (weight ratio 1:8), containing 6 ppm of HBr ($6.10^{-5}$ moles $Br^-$/litre reaction mixture) are charged into a 100 ml AISI 316 stainless steel autoclave, equipped with a cylindrical glass container, teflon magnetic stirrer, manometer and heat-exchange apparatus.

The autoclave is thermostat-regulated at 30° C., closed and then charged with a mixture of gases, previously prepared, consisting of 4% volume $H_2$, 4% volume $O_2$ and 92% volume $N_2$, at a total pressure of 65 atm. Stirring is carried out at 900 revs/minute for 1 hour substituting the gas phase every 15 minutes with a mixture of gases having the above composition.

The autoclave is then depressurized, the content is filtered to remove the catalyst and an aliquot of the solution is analyzed by titration with potassium permanganate to determine the concentration of hydrogen peroxide, which proves to be equal to 2.9% by weight with respect to the reaction mixture.

From the increase in weight of the solution and concentration of $H_2O_2$, the selectivity with respect to the converted hydrogen is 50%.

EXAMPLE 7

Synthesis of Hydrogen Peroxide

The reaction is carried out under the same operating conditions indicated in example 6, but using 23 mg of catalyst prepared as described in example 4. A solution is obtained, containing 3.1% by weight of hydrogen peroxide. From the increase in weight of the solution, the selectivity with respect to the converted hydrogen is 58%.

EXAMPLE 8 (comparative)

The reaction is carried out under the same operating conditions indicated in example 6, but using 23 mg of catalyst prepared as described in example 5. A solution is obtained with a content by weight of hydrogen-peroxide equal to 0.25%. The selectivity with respect to the converted hydrogen is 7%.

EXAMPLE 9

Preparation in Continuous of Hydrogen Peroxide

The experimentation is carried out in a 300 ml Hastelloy C steel autoclave, equipped with a magnetic stirrer capable of maintaining the number of revs/minute during the test from 0 to 2000, a pressure controller, a thermostatic jacket and gas-flow-controllers.

0.45 g of catalyst prepared as described in example 4 ($4.2 \cdot 10^{-5}$ moles of Pd) and 150 g of water containing 4 ppm of HBr ($5 \cdot 10^{-5}$ moles of $Br^-$/litre of reaction mixture) are charged into this autoclave.

The autoclave is pressurized, without stirring, to 100 atm with a gaseous mixture consisting of 3.6% volume $H_2$, 46.4% volume $O_2$ and 50% volume of $N_2$. The stirring is then activated up to 1400 revs/minute and the pressure is maintained at 100 atm with a gas flow in continuous equal to 300 1/hour.

The reaction is followed by gaschromatographic analysis of aliquots of the gaseous phase leaving the reactor every 15 minutes.

During the test, the conversion of hydrogen is maintained constant (45%).

After 4 hours of reaction at 18° C., the concentraton of $H_2O_2$ is equal to 12.5% by weight. The selectivity with respect to the converted hydrogen is equal to 60%.

This content of $SO_4^{--}$ ion in solution is equal to 3 ppm.

EXAMPLE 10

The same procedure is adopted as in example 9, but using as reaction medium 150 g of a mixture of water:methanol with a weight ratio 10:90, containing 3 ppm of HBr ($3 \cdot 10^{-5}$ moles $Br^-$/litre of reaction mixture).

The production of hydrogen peroxide is carried out at 15° C. The conversion of hydrogen remains constant during the test at 80%.

After 2 hours of reaction, the concentration of $H_2O_2$ was equal to 13.1% by weight. The selectivity with respect to the converted hydrogen is 75%.

The content of $SO_4^{--}$ ion in solution is equal to 2.5 ppm.

EXAMPLE 11

A 380 ml Hastelloy C steel autoclave is used, equipped with a magnetic stirrer, a pressure controller, therostatic jacket and gas-flow controllers.

0.60 g of catalyst prepared as described in example 3 ($5.6 \cdot 10^{-5}$ moles of Pd) and 200 g of water containing 5 ppm of HBr ($6.2 \cdot 10^{-5}$ moles of $Br^-$/litre of reaction mixture) are charged into the autoclave.

The autoclave is pressurized, without stirring, to 95 atm with a gaseous mixture consisting of 3.66 volume $H_2$, 36.4% volume $O_2$ and 60% volume of $N_2$. The stirring is then activated up to 1400 revs/minute and the pressure is maintained with a flow in continuous of the same gaseous mixture.

During the test 120 g/hour of an aqueous solution containing 5 ppm of HBr are fed in continuous and volumes of liquid necessary for keeping the level of the autoclave constant, are discharged. The reaction is carried out at 25° C. for 8 hours.

The reaction is followed by gaschromatographic analysis of aliquots of the gaseous phase leaving the reactor every 15 minutes and the liquid phase every hour.

During the test, the conversion of hydrogen is maintained constant at 85%.

After 4 hours of reaction, the concentraton of $H_2O_2$ is equal to 6.5% by weight. The selectivity with respect to the converted hydrogen is equal to 60%. The content of $SO_4^{--}$ ion in solution is equal to 2 ppm.

After 8 hours of reaction the concentration of $H_2O_2$ and the selectivity with respect to the converted hydrogen remain constant at 6.5% and 60% respectively and the content of $SO_4^{--}$ ion in solution is less than 1 ppm.

EXAMPLE 12

The same procedure is adopted as in example 11, but using as reaction medium a mixture of water: methanol with a weight ratio of 4:96, a reaction temperature of 20° C. and feeding in continuous 200 g/hour of water:methanol mixture.

The hydrogen conversion is maintained constant during the test at a value equal to 85%.

In the sampling carried out after 4 hours of reaction, the concentration of hydrogen peroxide in solution is equal to 5.8% by weight. This value remains constant for the whole duration of the test which lasts 20 hours. The selectivity with respect to the hydrogen is 84%. The concentration of $SO_4^{--}$ ion in solution after 20 hours is less than 1 ppm.

EXAMPLE 13

The same procedure is adopted as in example 12, using the catalyst prepared as in example 4 and prolonging the reaction for 60 hours.

After 60 hours of reaction the hydrogen conversion is maintained constant at a value equal to 88%, the concentration of $H_2O_2$ is maintained at 6.2% by weight and the selectivity with respect to the hydrogen is 86%. The concentration of $SO_4^{--}$ ion in the reaction effluent from the thirtieth hour is zero.

EXAMPLE 14

Oxidation of Propylene 5 g of titanium silicalite TS-1 (EniChem, with a content of titanium equal to 2.05% by weight) in 500 g of methanol are suspended in a 1l reactor equipped with a mechanical stirrer with a gaseous effect and a thermostatic system (internal coil immersed in the reaction solution and external circulation jacket).

After thermostat-regulating the system at 40° C. and pressurizing with propylene at 1.2 atm (constant for the whole duration of the reaction), 266 g of hydrogen peroxide solution at 6.22%, obtained as described in example 13, are added in continuous at such a rate as to exhaust the addition of the oxidating agent in 15 minutes.

After this period a sample of reaction solution is taken.

The residual $H_2O_2$ is determined iodometrically, whereas the reaction product is quantified by gaschromatography. The results are:
conversion $H_2O_2$=96%
selectivity to propylene oxide=97%.

EXAMPLE 15

Ammoxymation of Cyclohexanone 10 g of titanium silicalite TS-1 (EniChem, with a content of titanium equal to 2.05% by weight) in 500 g of a mixture consisting of:

| | |
|---|---|
| - methanol | 41% by weight |
| - water | 31% by weight |
| - cyclohexanone | 20% by weight |
| - ammonia | 8% by weight | are suspended in a 1 l reactor equipped with a mechanical stirrer with a gaseous effect and a thermostatic system (internal coil immersed in the reaction solution and external circulation jacket).

After theromstat-regulating the system at 800° C. and pressurizing with helium at 1.5 atm, 67.5 g of the $H_2O_2$ solution (6.22%) obtained in example 13 are added in continuous in 5 hours.

After this period a sample of reaction solution is taken.

The residual $H_2O_2$ is determined iodometrically, whereas the reaction product is quantified by gaschromatography. The results are:
conversion of cyclohexanone=92.5%
selectivity to cyclohexanone=96%.

The conversion of hydrogen peroxide is quantitative.

TABLE 3

| Elements | CECA carbon as such | Carbon # 1 | Carbon # 2 |
|---|---|---|---|
| B | 20 | <1 | <1 |
| Na | 200 | 17 | 20 |
| Mg | 2,000 | 47 | 47 |
| Al | 350 | 60 | 100 |
| Si (1) | 300 | 400 | 380 |
| P | 1,300 | 57 | 64 |
| S (1) | 200 | 3,900 | 4,800 |
| Cl (1) | 100 | <100 | <100 |
| K | 3,800 | 68 | 90 |
| Ca | 6,800 | 90 | 80 |
| Ti | 3 | <1 | <1 |
| Cr | 1 | <1 | <1 |
| Mn | 215 | 4 | 4 |
| Fe | 140 | 30 | 17 |
| Co | <1 | <1 | <1 |
| Ni | <1 | <1 | <1 |
| Cu | 5 | 2 | 8 |
| Zn | 3 | 8 | 3 |
| Rb | 8 | <1 | <1 |
| Sr | 17 | <1 | <1 |
| Nb | <1 | <1 | <1 |
| Mo | 1 | 2 | <1 |
| Pd | <1 | <1 | <1 |
| Ag | <1 | <1 | <1 |

TABLE 3-continued

| Elements | CECA carbon as such | Carbon # 1 | Carbon # 2 |
|---|---|---|---|
| Ba | 11 | <1 | <1 |
| Ta | <1 | <1 | <1 |
| Hg (2) | 0.11 | 1.3 | 1.3 |
| Pb | <1 | <1 | <1 |
| others | <1 | <1 | <1 |

What is claimed is:

1. A catalyst consisting essentially of a metal belonging to group VIII supported on a carrier, wherein Raid carrier is an activated carbon functionalized with sulfonic groups.

2. The catalyst of claim 1, wherein the metal belonging to group VIII is selected from the group consisting of palladium, platinum, ruthenium, iridium, and rhodium.

3. The catalyst of claim 2, wherein the metal is palladium.

4. The catalyst of claim 1, wherein the quantity of metal belonging to group VIII is between 0.05 and 5% by weight with respect to the carrier.

5. The catalyst of claim 4, wherein the quantity of metal belonging to group VIII is between 0.1 and 1% by weight with respect to the carrier.

6. The catalyst of claim 1, wherein the activated carbon functionalized with sulfonic groups contains from 0.1 to 1% by weight of sulfur.

7. The catalyst of claim 1, which is produced by a method which comprises:
   a) contacting the activated carbon with a sulfonating compound with a weight ratio of sulfonating compound: carbon ranging from 1:20 to 20:1, at a temperature ranging from 50 to 350° C.;
   b) washing the activated carbon functionalized with sulfonic groups with water until the washing water is of neutral pH;
   c) treating the sulfonated activated carbon functionalized with sulfonic groups obtained in step b) with an oxidizing compound, at a temperature ranging from 30 to 100° C.;
   d) washing the activated carbon functionalized with sulfonic groups obtained in step c) until the oxidizing (compound disappears in the washing water and drying the washed functionalized activated carbon at a temperature of 100 to 120° C.; and then
   e) supporting tie metal of group VIII on the activated carbon functionalized with sulfonic groups.

8. The catalyst of claim 7, wherein step a) is preceded by a step a') wherein the activated carbon is washed with an aqueous solution of hydrochloric acid 1–5% by weight, at a temperature ranging from 50 to 80° C.

9. The catalyst of claim 7, wherein in step a) the weight ratio of sulfonating compound: carbon is between 1:5 and 5:1, and the temperature from 70 to 200° C.

10. The catalyst of claim 7, wherein the sulfonating compound is selected from the group consisting of sulfuric acid, $SO_3$ and oleum.

11. The catalyst of claim 7, wherein in step c) said oxidizing compound is an aqueous solution of hydrogen peroxide used at a concentration ranging from 1 to 4% by weight, with a weight ratio sulfonated compound activated carbon and aqueous solution of hydrogen peroxide ranging from 1:10 to 1:100.

12. The catalyst of claim 11, wherein the weight ratio of sulfonated compound activated carbon and aqueous solution of hydrogen peroxide is between 1:20 and 1:50.

13. The catalyst of claim 7, wherein in step c) the temperature is between 50 and 70° C.

14. A process for directly producing hydrogen peroxide, which comprises reacting hydrogen and oxygen in a solvent which contains a promoter in the presence of a catalyst consisting essentially of a metal of group VIII supported on a carrier, wherein said carrier is an activated carbon functionalized with sulfonic groups.

15. The process of claim 14, wherein the metallic catalyst of group VIII is selected from the group consisting of palladium, platinum, ruthenium, iridium and rhodium.

16. The process of claim 15, wherein the metal is palladium.

17. The process of claim 14, wherein the promoter is a compound containing a halogen.

18. The process of claim 17, wherein the compound containing a halogen is selected from the group consisting of hydrobromic acid, sodium bromide, potassium bromide, sodium bromate, ammonium bromide, sodium chloride, potassium chloride and ammonium chloride.

19. The process of claim 18, wherein the compound is hydrobromic acid, sodium bromide or potassium bromide.

20. The process of claim 14, wherein a quantity of promoter is used such as to give a concentration of the halide ion of more than $10^{-7}$ moles per liter of reaction medium.

21. The process of claim 20, wherein a quantity of promoter is used such as to give a concentration of the halide ion between $10^{-6}$ and $10^{-4}$ moles per liter of reaction medium.

22. The process of claim 14, wherein the reaction medium is selected from the group consisting of water, an alcohol or a mixture thereof.

23. The process of claim 22, wherein the alcohol is selected from the group consisting of methanol, ethanol, and isopropanol.

24. The process of claim 23, wherein the alcohol is methanol.

25. The process of claim 14, wherein the reaction medium is a mixture of water:alcohol with a weight ratio between the two of 99:1 to 1:99.

26. The process of claim 25, wherein the weight ratio water:alcohol is between 90:10 and 5:95.

27. The process of claim 14, wherein the reaction is carried out at a temperature ranging from 0 to 70° C.

28. The process of claim 27, wherein the reaction temperature is between 15 and 50° C.

29. The process of claim 14, wherein the reaction is carried out at a total pressure higher than atmospheric pressure and with a molar ratio hydrogen:oxygen ranging from 1:1 to 1:100.

30. The process of claim 29, wherein the total pressure is between 50 and 300 atmospheres and the molar ratio hydrogen:oxygen is between 1:5 and 1:50.

31. The process of claim 14, wherein the reaction is carried out using air as oxygen source.

32. The process of claim 14, wherein the catalyst is used in quantities ranging from $10^{-6}$ to $10^{-2}$ moles of metal contained in the catalyst per liter of reaction medium.

33. The process of claim 32, wherein the catalyst is used in quantities ranging from $10^{-4}$ to $10^{-3}$ moles of metal contained in the catalyst per liter of reaction medium.

34. A process for catalytic oxidation of substrates, which comprises:
 (a) preparing hydrogen peroxide by reacting hydrogen and oxygen in a solvent containing a promoter, in the presence of a catalyst consisting essentially of a metal of group VIII supported on activated carbon functionalized with sulfonic groups;
 (b) recovering the reaction mixture containing hydrogen peroxide;
 (c) contacting the reaction mixture containing hydrogen peroxide with a substrate selected from the group consisting of olefins, aromatic hydrocarbons, ammonia and carbonyl compounds, in the presence of a catalyst comprising titanium-silicalite to obtain an oxidated product;
 (d) recovering the oxidized product from the reaction mixture of step c); and
 (e) recycling non-reacted substrate in step c) and the reaction solvent in steps a) and c).

35. The process of claim 34, wherein in step c) the catalyst is selected from the group consisting of titanium-silicalites with an MFI structure, titanium-silicalites with an MEL structure, and an Intermediate MFI/MEL structure.

36. The process of clam 35, wherein the titanium-silicalites with an MFI structure are modified with trivalent metals selected from the group consisting of aluminum, iron, boron and gallium.

37. The process of claim 34, wherein the catalyst is titanium-silicalite having the formula:

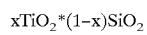

$xTiO_2 * (1-x)SiO_2$ wherein x represents a number between 0.0001 and 0.04.

38. The process of claim 34, wherein said process is continuous.

* * * * *